Patented July 9, 1946

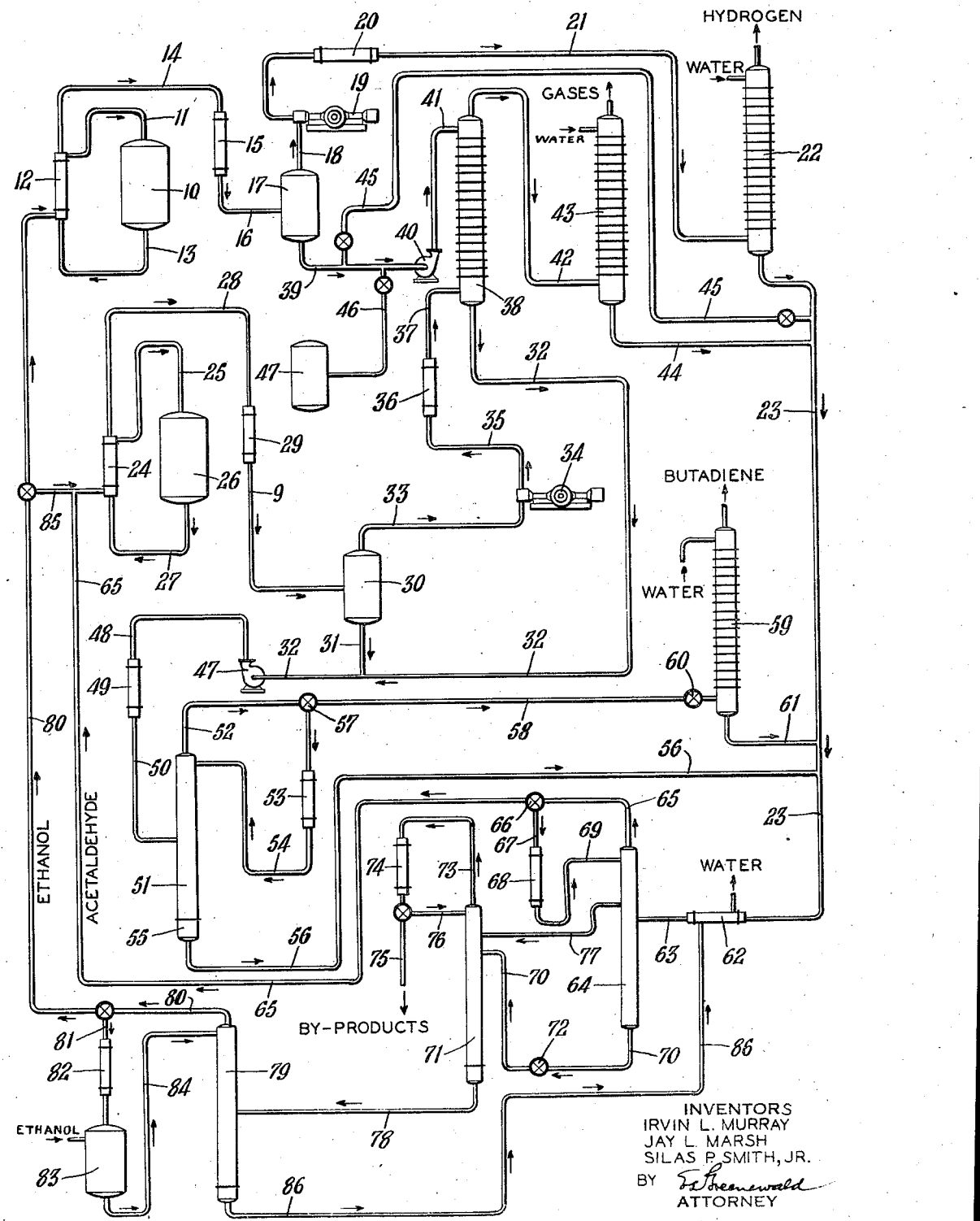

2,403,742

UNITED STATES PATENT OFFICE 2,403,742

PROCESS FOR MAKING BUTADIENE

Irvin L. Murray, Charleston, and Jay L. Marsh, South Charleston, W. Va., and Silas P. Smith, Jr., Louisville, Ky., assignors to Carbide and Carbon Chemicals Corporation, a corporation of New York Application September 9, 1943, Serial No. 501,611

8 Claims. (Cl. 260—681)

This invention relates to a process for making butadiene from ethanol.

According to this invention, butadiene is formed from ethanol in two steps, one step being the conversion of ethanol to acetaldehyde in a separate reaction, and the other step being the separate conversion to butadiene of a mixture of the acetaldehyde formed in the first step and ethanol. Both reactions are carried out in the vapor phase. Although, some savings in the total heat required to operate both steps of the process may be obtained by introducing the gaseous reaction products from the acetaldehyde converter directly into the butadiene converter, greater advantages in economy and ease of operation are obtained by the process of this invention. In this invention, the products from both the acetaldehyde and the butadiene converters are separated from permanent gases produced in the reactions, the butadiene is separated from any unreacted ethanol and acetaldehyde, and the materials remaining from these separations, containing ethanol, acetaldehyde and by-products are introduced to a common distillation system. This distillation system removes the by-products produced in both reactions and supplies ethanol to the acetaldehyde converter, and ethanol and acetaldehyde to the butadiene converter. Thus, the entire process is operated in a cyclic and continuous manner. Ethanol, equivalent to that consumed in the process, is supplied to the system, preferably as reflux in a distillation column in which ethanol vapors are being removed. However, make-up ethanol may be supplied in any other convenient manner. For instance, it may be added as scrubbing liquid to separate butadiene from other gases of lower boiling point.

The process of this invention has the advantage that, by providing appropriate storage facilities for the crude products of each reaction, each reaction may be conducted independently. A further advantage is that both reaction systems utilize the same distillation system for the recovery of unconverted materials, which provides economy in the equipment required to operate the process.

In the first step of the process, ethanol vapors are passed to a reaction zone, and a part of such vapors converted to acetaldehyde by any of the known methods. These methods include dehydrogenation of the ethanol to acetaldehyde in the presence of dehydrogenation catalysts, or the catalytic oxidation of ethanol to acetaldehyde by molecular oxygen. The products from this reaction containing acetaldehyde and ethanol are condensed. Any permanent gases produced in the reaction, or present in the reaction products, also contain the vapors of this condensate, namely, acetaldehyde, ethanol, water and by-products. The valuable constituents may be recovered from these gases by compressing the gases and scrubbing them with water.

In the second step of the process, ethanol and acetaldehyde, preferably in the molar ratio of about 3 to 1, are reacted in the vapor state in the presence of suitable catalysts to form butadiene. A preferred catalyst is described in W. J. Toussaint and J. T. Dunn application Serial No. 460,120, filed September 29, 1942. Other catalysts for this reaction are reported in the literature. The effluent vapors and gases from the butadiene converter containing butadiene, ethanol, acetaldehyde, diethyl ether, ethylene, propylene and saturated hydrocarbon gases, and other by-products are passed through a condenser. Most of the vapors are condensed in this operation, but a large fraction of the butadiene is not liquefied and such fraction is present in the gases leaving the condenser. The butadiene may be recovered from such gases by compressing the gases and scrubbing them with a solvent, such as ethanol. However, economy in operation may be obtained by employing as the scrubbing liquid a material which is to be subjected to distillation in any event as described in the copending application, "Process for making butadiene," Serial No. 501,610, of I. L. Murray, J. L. Marsh and S. P. Smith, Jr. Such a material is the condensate of ethanol and acetaldehyde from the acetaldehyde reaction. Alternatively, the make-up ethanol required in the process may be employed as scrubbing liquid.

A subsequent scrubbing tower may be provided to recover the vapors of the scrubbing liquid from the gases leaving the butadiene scrubbing tower. Water is a suitable scrubbing liquid for use in this second tower.

The first condensate from the butadiene reaction and the liquid efflux from the scrubbing tower in which butadiene is removed from other gases are mixed and treated to recover the butadiene. This may be accomplished by a distillation process, in which butadiene is removed as a head product along with some acetaldehyde. The acetaldehyde may be removed by scrubbing the butadiene vapors with water, and the butadiene may be purified, if necessary, by known methods.

The condensates, still residues and liquid scrubber products from the previous operations which contain all the effluent materials of both reaction systems with the exception of butadiene, hydrocarbon impurities associated with the butadiene, and the permanent gases, are subjected to a series of distillations. The streams remaining after the separation of butadiene and other gases contain ethanol, acetaldehyde, water, and by-products, such as diethyl ether, which is formed in the butadiene reaction, and miscellaneous by-products of the acetaldehyde-forming reaction, such as ethyl acetate, acetic acid and butyraldehyde. The distillation system removes sufficient of the by-products to prevent their accumulation in the cyclic system, and recovers ethanol and acetaldehyde for passage to the acetaldehyde and butadiene reaction systems. One method by which this may be accomplished is to provide a series of stills adapted to remove the components in the order of their volatility. The first column in such a series removes acetaldehyde from the feed for passage to the butadiene converter. The acetaldehyde distills as its azeotropic mixture with diethyl ether, boiling at about 57° C. at 40 p. s. i. gauge pressure and containing approximately 75% acetaldehyde and 25% diethyl ether. Relatively large amounts of diethyl ether thus accumulate in the cyclic system and are recirculated through the butadiene converter. This tends to prevent the formation of additional amounts of diethyl ether in the reaction.

The residue from this distillation passes to another continuous column where the by-products are removed as a heads product containing a mixture of binary and ternary azeotropes involving acetaldehyde, water, diethyl ether, ethyl acetate, butyraldehyde and other impurities. A batch still may be provided for the periodic recovery from the by-products of the materials employed in the process.

The residue from the by-products removal still, consisting largely of ethanol and water, passes to an alcohol still operated under pressure, which generates an azeotropic mixture of ethanol and water for feeding both reaction systems. The water removed as a residue is customarily used for heating purposes before being discarded. Thus, it may be employed for heating the feed to the still in which acetaldehyde is removed and the feed to the still in which butadiene is removed.

Various methods of removing by-products, other than as indicated, may also be practiced, as by withdrawing by-products from plates in the butadiene, acetaldehyde, by-products, and ethanol column, in which such by-products accumulate.

Other arrangements of the distillation series may be carried out in which the materials to be separated are divided into two or more fractions, and such fractions treated to isolate the components, rather than the successive removal of each component in the order of its volatility, as described above.

The process of this invention represents an integrated process for making butadiene from ethanol, in which the acetaldehyde formed by dehydrogenation of ethanol is not passed directly into the butadiene converter, but, instead, is first passed to a recovery distillation system which produces acetaldehyde, largely freed from impurities formed in both reactions, for passage to the butadiene converter, and recovers unreacted ethanol. This process possesses the advantage over a process in which the products from the acetaldehyde converter are fed directly into the butadiene converter, in that the acetaldehyde converter need not be operated at undesirably high pressures in order to compensate for the pressure drop through both converters. If such high pressures were maintained, the yield of acetaldehyde by the dehydrogenation of ethanol would be decreased. The alternative to this, in which compressors are provided between the acetaldehyde converter and the butadiene converter, would greatly increase the cost of the installation and would make operation of the process more complex.

In addition, the passage of the by-products from the acetaldehyde reaction, including hydrogen, through the butadiene converter might tend to injure the butadiene catalyst, reduce the yield of butadiene, or form other by-products troublesome to remove.

Suitable apparatus and operating conditions for practicing the process described above will now be described with reference to the attached drawing but the invention is not restricted to these specific embodiments. All proportions specified are by weight.

Ethanol vapors along with about 10% water vapor are introduced to a converter 10 of the shell-and-tube type, through a pipe 11, after passing through a heat exchanger 12. The converter contains a copper catalyst at a temperature of about 280° C. and part of the ethanol is dehydrogenated to acetaldehyde in passing over this catalyst. The converter may be heated by circulating a high-boiling organic liquid through heating elements in the converter. The vapors leave the bottom of the converter through a pipe 13, pass through the heat exchanger 12 used to preheat the feed, and pass through a pipe 14 to a condenser 15, in which most of the vapors are condensed.

The uncondensed vapors, the gases and the condensate pass through a pipe 16 to a separating tank 17, in which the condensate collects at the bottom. The uncondensed vapors and gases containing acetaldehyde, ethanol, water and hydrogen pass from the top of the tank through a pipe 18 to a compressor 19, where they are compressed to a pressure of about 55 p. s. i. The compressed vapors and gases pass through a condenser 20, from which they are introduced through a pipe 21 to the base of a scrubbing tower 22. Here, the water-soluble vapors are dissolved and removed from the hydrogen by means of scrubbing water, and the liquid effluent flows through pipe 23 to the recovery distillation system.

The chemical reaction producing butadiene is conducted concurrently with that producing acetaldehyde. In this second chemical reaction, a mixture of ethanol and acetaldehyde vapors, preferably in the molar ratio of about 3 to 1, is passed through a heat exchanger 24 through a pipe 25 to a converter 26. The converter contains a catalyst of an appropriate type at a temperature of 300° to 350° C. Part of the ethanol and acetaldehyde are converted to butadiene in the converter, and the effluent vapors pass through a pipe 27 to the heat exchanger 24 which preheats the reactants. The vapors leave the heat exchanger through a pipe 28, and pass to a condenser 29, where more than half of both the butadiene and the acetaldehyde, and almost all the ethanol, are condensed. The vapors and condensate pass through pipe 9 to a settling tank 30, where the condensate is drawn off through pipes 31 and 32 to distillation column 51 to recover the butadiene. The vapors from the settling tank 30 contain acetaldehyde, butadiene in an amount of about 20%, diethyl ether, ethanol, and mono-olefines and saturated hydrocarbon gases in the amount of about 10%, and they pass through a pipe 33 to a compressor 34 where they are compressed to about 55 p. s. i.

The compressed vapors and gases pass through a pipe 35 to a condenser 36, where they are cooled to a temperature of about 38° C. Part of the vapors condense under these conditions and the condensate and uncondensed vapors and gases are introduced under pressure through pipe 37 to the base of a scrubbing tower 38, having about 40 trays. The first condensate from the acetaldehyde-producing reaction is withdrawn from tank 17 through a pipe 39 and pumped by a pump 40 through a pipe 41 to the top of tower 38. This condensate may contain about 8 parts of acetaldehyde, 70 parts of ethanol, 13 parts of water and 2 parts of acetic acid. This mixture of ethanol and acetaldehyde is a strong solvent for butadiene even in the presence of a small amount of water, and it is capable of scrubbing completely the butadiene from the ascending vapors when employed in amounts about equal to, or even somewhat less than, that of the vapors and condensate entering the base of the scrubbing tower at the temperature and pressure specified. The liquid effluent from the base of the tower contains substantially all the butadiene originally present in the entering gases and it is withdrawn through pipe 32 to distillation column 51 for recovery of the butadiene.

The gases leaving the top of tower 38 are approximately saturated with the components of the scrubbing liquid, principally, acetaldehyde and ethanol, and it is economical to recover these materials. To effect the recovery of the acetaldehyde and ethanol, the gases are passed through a pipe 42 to a second scrubbing tower 43, where they are subjected to the washing action of a down flowing stream of water. The liquid effluent from the tower passes through pipe 44 to pipe 23, and thence to the recovery distillation system. The gases from this scrubbing tower, containing mono-olefines, such as ethylene and propylene, saturated hydrocarbon gases, and some carbon dioxide and carbon monoxide are discharged from the system. The process just described is the subject to the copending application Serial No. 501,610 of I. L. Murray, J. L. Marsh and S. P. Smith, Jr., entitled "Process for making butadiene."

However, it is not essential to practice the process of that application in order to secure the benefits of the present invention. The condensate from the tank 17 may be withdrawn through by-pass pipe 45 to pipe 23, and be carried directly to the distillation system. The scrubbing liquid employed in column 38 may then comprise part or all of the make-up ethanol required in the process, which may be introduced through pipe 46 from ethanol storage tank 47. This make-up ethanol passes to the column for the recovery of butadiene and eventually to the recovery distillation system without additional equipment being provided. However, the heat economy secured by feeding the make-up ethanol as part of the reflux required in the operation of the ethanol still would be lost. Alternatively, a separate cycle for scrubbing such butadiene-containing gases may be provided in which the solvent employed as scrubbing liquid is separately distilled to strip off the butadiene, and residue cooled and reused in the scrubbing operation.

A composite feed from pipe 32 containing approximately 10% acetaldehyde, 5% diethyl ether, 55% ethanol, 15% water, 10% butadiene and 5% of other hydrocarbons and impurities is passed through pump 47 and is introduced through pipe 48 under a pressure of 55 to 70 p. s. i. to a heat exchanger 49, where it is heated to about 110° C. by means of a suitable heating fluid. The feed passes through a pipe 50 to a distillation column 51 at about the thirtieth tray thereof. This column may be of the ordinary bubble-cap type with copper trays. A fifty-five tray column possesses sufficient trays for the separation desired with adequate allowance for plate efficiency. The column is heated by steam, preferably by means of a calandria through which the contents of the kettle circulate.

When the column operates under a pressure of about 65 p. s. i., the overhead vapor distills at about 47° C. and contains approximately 5.0% acetaldehyde, 90% butadiene and 5.0% butenes and butane. A small amount of water may also be present in the overhead vapor. Part of the overhead vapor which is removed through pipe 52 is condensed in a condenser 53, the condensate being pumped through a pipe 54 as reflux to the column. The reflux ratio employed in the operation of the column may be varied from about 4:1 to 20:1.

The residue is removed from the kettle 55 through a pipe 56 and it contains acetaldehyde, diethyl ether, ethanol, water and impurities. It is to be noted that the column operates with both an enriching and exhausting section, and that the residue is denuded of butadiene. The residue passes to the recovery distillation system through pipe 23.

Of the overhead vapor, the part which is not condensed and returned as reflux passes through a valve 57 and through pipe 58, and enters a scrubber 59 through a pressure reducing valve 60. The scrubber may be a forty-tray column which operates at a pressure of 35 pounds per square inch at a temperature of 35° C., and it is designed to remove the acetaldehyde from the butadiene vapor by dissolving the acetaldehyde in water. Butadiene is a gas at this temperature and pressure and it does not appreciably condense, whereas, at the same time, acetaldehyde is readily absorbed in water. The water, introduced at the top of the column flows downward and selectively dissolves the acetaldehyde from the ascending vapors. The vapors from the top of the column may contain about 95% butadiene and 5% butenes and butane. The butadiene may be separated from the butenes and the butane by known methods, which are not a part of the present invention.

The aqueous scrubbing liquid from the bottom of the scrubbing tower contains a small amount of acetaldehyde, and it passes through a pipe 61 to the recovery distillation system.

The scrubber residues from scrubbers 22, 43, and 59, and the residue from column 51 are commingled in pipe 23 to form a composition containing approximately 15% acetaldehyde, 5% diethyl ether, 40% ethanol, and 35% water and 5% by-products. This mixture is introduced through a preheater 62 by means of pipe 63 to a distillation column 64. This column may operate at a pressure of about 40 p. s. i. gauge and at a head temperature of about 57° to 58° C. It is heated by steam, preferably by circulating the contents of the kettle through an external inclined calandria. A mixture of the azeotrope of acetaldehyde and diethyl ether, together with azeotropes of acetaldehyde and other by-products, the composition being about 75% acetaldehyde, 20% diethyl ether, and 5% by-products, is withdrawn as vapor through pipe 65, and passes as one of the reactants to the butadiene converter 26. Sufficient overhead vapor to constitute a reflux ratio of about 3 to 1 is withdrawn through proportioning valve 66 through a pipe 67 to a condenser 68, where it is condensed and returned as reflux to the column 64 through pipe 69.

The residues from column 64, containing principally ethanol and water, the remainder being diethyl ether, acetaldehyde and other by-products pass through a pipe 70 to distillation column 71, after passing through a pressure reducing valve 72. This column may operate at a pressure of 20 p. s. i. gauge and a head temperature of 65° to 75° C. It generates an overhead vapor containing acetaldehyde, diethyl ether, ethyl acetate, butyraldehyde, methyl ethyl ketone, and other impurities. This overhead vapor all passes through pipe 73 to condenser 74, where about 1/10 of the condensate is withdrawn through pipe 75 to storage. These by-products may be distilled from time to time to recover their valuable components. The remainder of the condensate passes through pipe 76 to column 71 as reflux. The column is heated by steam, preferably by circulating the contents of the kettle through an external inclined calandria.

In the operation of the acetaldehyde still 64, there is a tendency for by-products to accumulate in the upper third of the column, when the base temperature is sufficiently high, about 120° C., to volatilize all the acetaldehyde from the base of the column. Such by-products eventually pass from the top of the column and reduce the concentration of acetaldehyde below the desired value. This may be prevented by withdrawing about 2 to 5% of the total down-flow from the column 64, through pipe 77, either in the liquid or vapor phase, and introducing it in the upper third of the by-products distillation column 71. The approximate composition of the side stream thus withdrawn may be acetaldehyde, 40%, diethyl ether, 45%, and by-products, 15%. This process is more fully described in application Serial No. 526,792, filed March 16, 1944, by M. E. Hitchcock and J. A. Field, which is assigned to the same assignee as the present application.

The residue from column 71, containing mostly ethanol and water, along with some by-products, is pumped through pipe 78 to distillation column 79 in which ethanol is separated from the water. This column may operate at a pressure of 50 p. s. i. gauge and a head temperature of 118° C. It generates an azeotropic mixture of 85% ethanol, 10% water and 5% by-products, which is withdrawn through pipe 80 as reactant material for the acetaldehyde and butadiene converters. The feed to the butadiene converter is withdrawn through pipe 85. About twice as much vapor as is withdrawn through pipe 80 is withdrawn through pipe 81 and condensed in condenser 82. The condensate passes to a reflux storage tank 83 to which is added an amount of ethanol equivalent to that consumed in the process. This mixture is pumped through pipe 84 as reflux for the column 79. The column is heated by steam, preferably by the direct introduction of steam into the kettle. The aqueous waste is withdrawn from the kettle through a line 84, and before being discarded, it is used as a heating fluid in the various preheaters shown in the system, for instance, it may be withdrawn through pipe 86 and employed as heating fluid in heat exchanger 62.

The addition of make-up ethanol as part of the reflux required in the column used for distillation of the alcohol provides a saving in the heat otherwise required to operate the still, as described in I. L. Murray Patent No. 2,249,847. Obviously, however, the make-up ethanol may be added in other ways to the cyclic process, as previously pointed out. Modifications of the invention other than as specifically described, may be made without departing from the principle of the invention. The essential features of the invention consist of a cyclic two-step process for the production of butadiene from ethanol, the integration of an acetaldehyde-producing reaction with a butadiene producing reaction, and the provision of a common distillation system for recovering the unconverted products of the two reactions.

We claim:

1. A cyclic process for making butadiene which comprises introducing ethanol vapors to a reaction zone, converting a part of such ethanol vapors to acetaldehyde and separating an acetaldehyde-ethanol condensate from the remainder of the reaction products; concurrently introducing ethanol and acetaldehyde vapors to a separate reaction zone, converting a part of the ethanol and acetaldehyde to butadiene and separating the butadiene from unconverted ethanol and acetaldehyde; distilling acetaldehyde from a mixture containing such unconverted acetaldehyde and said condensate and passing it to the butadiene-producing reaction zone, distilling ethanol from a mixture of the remainder of said condensate and such unconverted ethanol and returning said recovered ethanol to at least one of the reaction zones; and introducing additional ethanol to at least one reaction zone.

2. A cylic process for making butadiene which comprises introducing ethanol vapors to a reaction zone, converting a part of such vapors to acetaldehyde and separating an acetaldehyde-ethanol condensate from the remainder of the reaction products; concurrently introducing ethanol and acetaldehyde vapors to a separate reaction zone, converting a part of the ethanol and acetaldehyde in the vapor phase to butadiene and separating the butadiene from unconverted ethanol and acetaldehyde; distilling acetaldehyde vapors from a mixture containing such unconverted acetaldehyde and said condensate and passing such vapors to the butadiene-producing reaction zone; distilling ethanol vapors from a mixture containing such unconverted ethanol and the remainder of said condensate, after expulsion of acetaldehyde, and returning such ethanol vapors to both reaction zones; and introducing make-up ethanol as a reactant to at least one reaction zone.

3. A cyclic process for making butadiene which comprises introducing ethanol vapors to a reaction zone, converting a part of such vapors to acetaldehyde and separating an acetaldehyde-ethanol condensate from the remainder of the reaction products; concurrently introducing ethanol and acetaldehyde vapors to a separate reaction zone, coverting a part of the ethanol and acetaldehyde in the vapor phase to butadiene and separating the butadiene from unconverted ethanol and acetaldehyde; combining such unconverted ethanol and acetaldehyde with said condensate to form a mixture containing acetaldehyde and ethanol; distilling acetaldehyde vapors from said mixture and passing such vapors to the butadiene-producing reaction zone; distilling ethanol vapors from the residue remaining from this distillation and returning such ethanol vapors to at least one of the reaction zones, and introducing make-up ethanol as a reactant to at least one reaction zone.

4. A cyclic process for making butadiene which comprises introducing ethanol vapors to a reaction zone, converting a part of such ethanol to acetaldehyde and separating an acetaldehyde-ethanol condensate from the remainder of the reaction products; concurrently introducing ethanol and acetaldehyde vapors to a separate reaction zone, converting ethanol and acetaldehyde to butadiene and by-products and separating butadiene from the by-products formed and unconverted ethanol and acetaldehyde; separating at least part of such by-products from unconverted acetaldehyde and ethanol; distilling acetaldehyde vapors from a mixture containing such unconverted acetaldehyde and said condensate and introducing them to the butadiene-producing reaction zone; distilling ethanol vapors from a mixture containing such unconverted ethanol and the remainder of said condensate, after expulsion of acetaldehyde, and returning such recovered ethanol to at least one reaction zone; and introducing make-up ethanol to at least one reaction zone.

5. A cyclic process for making butadiene which comprises introducing ethanol vapors to a reaction zone, converting a part of such ethanol to acetaldehyde and separating an acetaldehyde-ethanol condensate from the remainder of the reaction products; concurrently introducing ethanol and acetaldehyde vapors to a separate reaction zone, converting ethanol and acetaldehyde to butadiene and separating butadiene from unconverted ethanol and acetaldehyde; combining such unconverted ethanol and acetaldehyde with said condensate to form a mixture containing acetaldehyde, ethanol and by-products of the two vapor phase reactions, distilling acetaldehyde vapors from said mixture and introducing them to the butadiene-producing reaction zone; distilling at least part of the by-products from the residue from the acetaldehyde distillation; distilling ethanol vapors from the residue of the by-products distillation and returning such recovered ethanol to at least one of said reaction zones; and introducing make-up ethanol to at least one reaction zone.

6. A cyclic process for making butadiene which comprises introducing ethanol vapors to a reaction zone, dehydrogenating a part of such ethanol to acetaldehyde and separating an acetaldehyde-ethanol condensate from the hydrogen gas produced; concurrently introducing ethanol and acetaldehyde vapors to a separate reaction zone, converting ethanol and acetaldehyde to butadiene and separating butadiene from unconverted ethanol and acetaldehyde, combining such unconverted ethanol and acetaldehyde with said condensate to form a mixture containing acetaldehyde, ethanol and by-products of the two vapor phase reactions, distilling acetaldehyde vapors from said mixture and introducing them to the butadiene-producing reaction zone; distilling at least part of the by-products from the residue from the acetaldehyde distillation; distilling ethanol vapors from the residue of the by-products distillation and returning such recovered ethanol to both of said vapor phase reactions, and introducing make-up ethanol as reflux in said third distillation.

7. A cyclic process for making butadiene, which comprises introducing ethanol vapors to a reaction zone, converting a part of such ethanol to acetaldehyde and separating an acetaldehyde-ethanol condensate from the remainder of the reaction products; converting a part of ethanol and acetaldehyde vapors to butadiene and other hydrocarbon gases in a separate reaction zone, condensing the reaction products, and separating a gaseous hydrocarbon mixture containing butadiene from unconverted acetaldehyde and ethanol; bringing such hydrocarbon gases in intimate contact with a scrubbing liquid containing ethanol as the principal constituent to liquefy and dissolve butadiene therein; distilling butadiene from such scrubbing liquid and recovering a scrubbing liquid residue; distilling acetaldehyde vapors from a mixture containing such unconverted acetaldehyde and said condensate, and passing such vapors to the butadiene reaction zone; distilling ethanol vapors from a mixture containing said scrubbing liquid residue, said unconverted ethanol, and the remainder of said condensate, after expulsion of acetaldehyde, and returning such ethanol vapors to both reaction zones; and introducing make-up ethanol to at least one reaction zone.

8. A cyclic process for making butadiene, which comprises introducing ethanol vapors to a reaction zone, converting a part of such ethanol to acetaldehyde and separating an acetaldehyde-ethanol condensate from the remainder of the reaction products; converting a part of ethanol and acetaldehyde vapors to butadiene and other hydrocarbon gases in a separate reaction zone, condensing the reaction products, and separating a gaseous hydrocarbon mixture containing butadiene from unconverted acetaldehyde and ethanol; bringing such hydrocarbon gases in intimate contact with a scrubbing liquid containing ethanol as the principal constituent to liquefy and dissolve butadiene therein; distilling butadiene from such scrubbing liquid and recovering a scrubbing liquid residue; distilling acetaldehyde vapors from a mixture containing such unconverted acetaldehyde and said condensate, and passing such vapors to the butadiene reaction zone; distilling ethanol vapors from a mixture containing said scrubbing liquid residue, said unconverted ethanol, and the remainder of said condensate, after expulsion of acetaldehyde, and returning such ethanol vapors to both reaction zones; and introducing make-up ethanol as said scrubbing liquid.

IRVIN L. MURRAY.
JAY L. MARSH.
SILAS P. SMITH, JR.